(12) United States Patent
Blease et al.

(10) Patent No.: US 9,958,095 B2
(45) Date of Patent: May 1, 2018

(54) COUPLING AND SEAL

(71) Applicant: Victaulic Company, Easton, PA (US)

(72) Inventors: Kevin J. Blease, Easton, PA (US);
Justin P. Brandt, Flemington, NJ (US);
Craig Haney, Nazareth, PA (US); Steve A. Wortmann, Slatington, PA (US);
Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 20 days.

(21) Appl. No.: 14/844,395

(22) Filed: Sep. 3, 2015

(65) Prior Publication Data

US 2016/0076681 A1    Mar. 17, 2016

Related U.S. Application Data

(60) Provisional application No. 62/048,905, filed on Sep. 11, 2014.

(51) Int. Cl.
| | |
|---|---|
| *F16L 17/00* | (2006.01) |
| *F16L 17/04* | (2006.01) |
| *F16L 21/00* | (2006.01) |
| *F16L 25/12* | (2006.01) |
| *F16L 21/06* | (2006.01) |
| *F16L 23/08* | (2006.01) |

(52) U.S. Cl.
CPC ............. *F16L 17/04* (2013.01); *F16L 21/005* (2013.01); *F16L 25/12* (2013.01); *F16L 21/065* (2013.01); *F16L 23/08* (2013.01)

(58) Field of Classification Search
CPC ........ F16L 17/073; F16L 17/04; F16L 17/035
USPC ........................................ 285/112, 337, 367
See application file for complete search history.

(56) References Cited

U.S. PATENT DOCUMENTS

| 1,541,601 | A | * | 6/1925 | Tribe | F16L 17/04 |
| | | | | | 277/614 |
| 1,805,666 | A | | 5/1931 | Hukill | |
| 1,808,262 | A | * | 6/1931 | Hele-Shaw | F16L 17/04 |
| | | | | | 277/618 |
| 1,821,867 | A | | 9/1931 | Wilson | |

(Continued)

FOREIGN PATENT DOCUMENTS

| EP | 0396952 | * 11/1990 |
| GB | 2121133 | 12/1983 |

OTHER PUBLICATIONS

Copenheaver, Blaine; International Search Report from corresponding International Patent Application No. PCT/US2015/048320; dated Nov. 27, 2015; pp. 1-2; United States Patent and Trademark Office as International Searching Authority; Alexandria, Virginia, USA.

(Continued)

*Primary Examiner* — Aaron M Dunwoody
(74) *Attorney, Agent, or Firm* — Ballard Spahr, LLP

(57) ABSTRACT

A mechanical coupling for joining pipe elements end to end has a channel that receives a ring seal. The channel is defined by oppositely disposed sidewalls and the ring seal has lobes on opposite sides. The lobes have surfaces facing the side surfaces of the channel. When the ring seal is seated within the channel, each lobe surface contacts a respective side surface such that the lobes deform inwardly toward the center of the channel.

42 Claims, 5 Drawing Sheets

(56) References Cited

U.S. PATENT DOCUMENTS

| | | | | |
|---|---|---|---|---|
| 1,867,891 | A | * | 7/1932 | Reynolds ................ F16L 17/04 277/616 |
| 1,994,361 | A | * | 3/1935 | Johnson ................ F16L 17/04 277/605 |
| 2,028,182 | A | * | 1/1936 | Barnickol, Jr. ......... F16L 17/04 277/616 |
| 2,507,261 | A | | 5/1950 | Mercier |
| 2,687,906 | A | | 8/1954 | Schnell |
| 3,004,780 | A | | 10/1961 | Main |
| 3,062,565 | A | | 11/1962 | Word, Jr. |
| 3,134,612 | A | * | 5/1964 | Glasgow ................ F16L 17/04 277/612 |
| 3,403,931 | A | | 10/1968 | Crain et al. |
| 4,189,172 | A | * | 2/1980 | Perrin ................... F16L 23/165 285/12 |
| 4,350,350 | A | * | 9/1982 | Blakeley ................ F16L 17/04 277/626 |
| 4,480,861 | A | | 11/1984 | Cann, Jr. |
| 4,629,217 | A | * | 12/1986 | Straub .................... F16L 17/02 285/112 |
| 4,779,903 | A | | 10/1988 | Maier et al. |
| 5,058,931 | A | * | 10/1991 | Bowsher ................ F16L 17/04 285/112 |
| 5,476,292 | A | | 12/1995 | Harper |
| 7,086,131 | B2 | | 8/2006 | Gibb et al. |
| 7,472,911 | B2 | * | 1/2009 | Sun ........................ F16L 17/04 277/608 |
| 8,038,176 | B2 | * | 10/2011 | Bowman ................ F16L 17/04 285/112 |
| 8,069,547 | B2 | | 12/2011 | Gibb et al. |
| 8,282,136 | B2 | | 10/2012 | Vandal et al. |
| 8,424,918 | B2 | * | 4/2013 | Gibb ....................... F16L 17/04 285/112 |
| 8,628,122 | B2 | | 1/2014 | Kozal |
| 8,819,914 | B2 | | 9/2014 | Porter et al. |
| 2003/0062718 | A1 | * | 4/2003 | Radzik .................... F16L 17/04 285/94 |
| 2009/0146417 | A1 | * | 6/2009 | Lippka ................. F16L 17/025 285/112 |
| 2010/0001521 | A1 | * | 1/2010 | Vandal .................... F16L 17/04 285/337 |
| 2013/0185919 | A1 | | 7/2013 | Beagen, Jr. |
| 2013/0257045 | A1 | * | 10/2013 | Mikami ................. F16L 17/04 285/364 |
| 2014/0327238 | A1 | * | 11/2014 | Bowman ................ F16L 17/04 285/112 |

OTHER PUBLICATIONS

Copenheaver, Blaine; Written Opinion of the International Searching Authority from corresponding International Patent Application No. PCT/US2015/048320; pp. 1-11; United States Patent and Trademark Office as International Searching Authority; Alexandria, Virginia, USA.

* cited by examiner

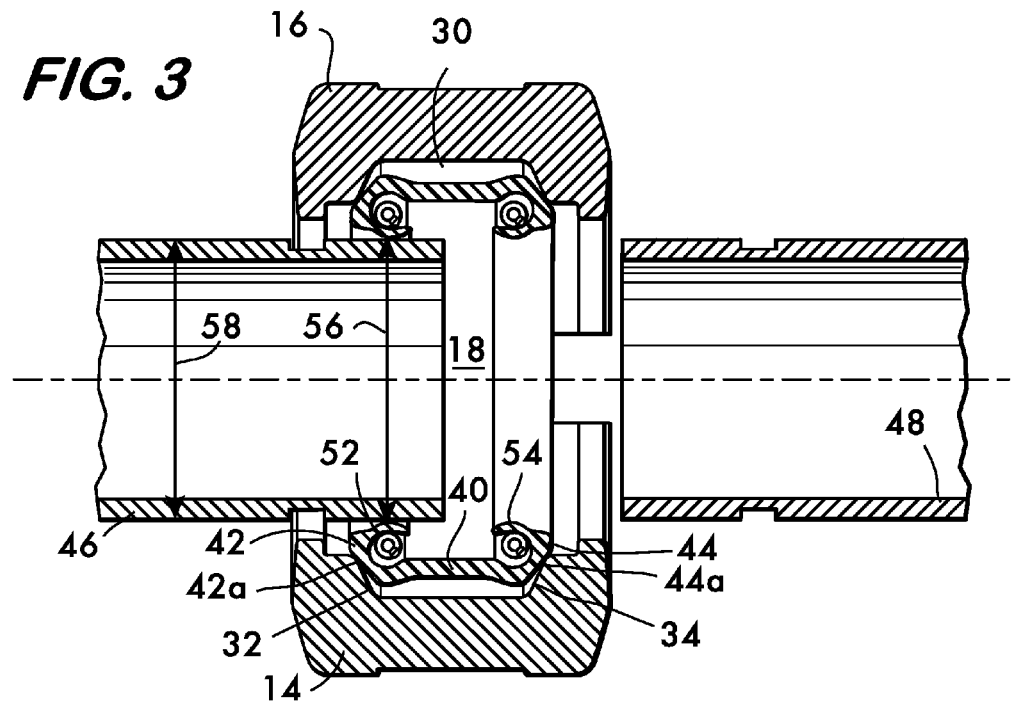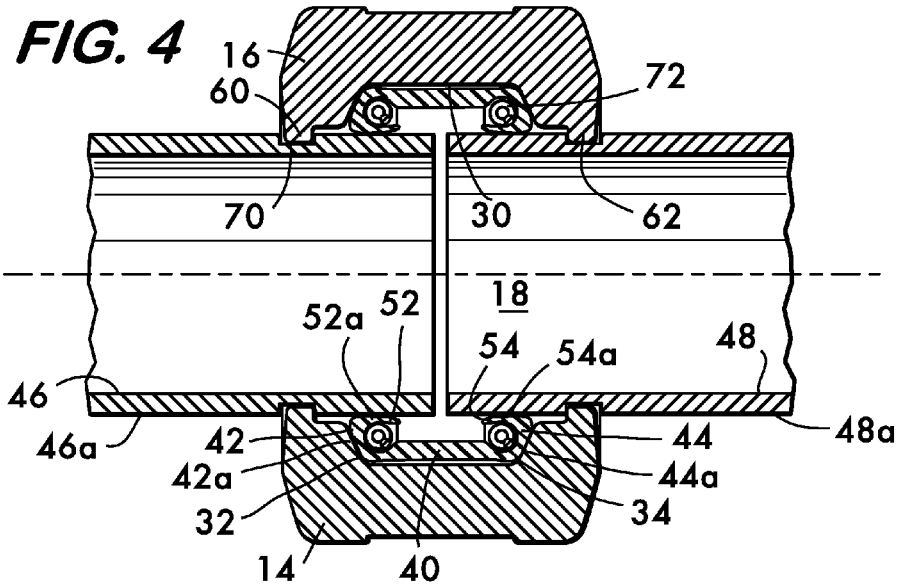

under this invention was filed at § 371.

COUPLING AND SEAL

CROSS REFERENCE TO RELATED APPLICATION

This application is based upon and claims benefit of priority to U.S. Provisional Patent Application No. 62/048,905, filed Sep. 11, 2014 and hereby incorporated by reference.

FIELD OF THE INVENTION

This invention relates to mechanical couplings for joining pipe elements in end to end relation and seals associated with such couplings.

BACKGROUND

Mechanical couplings for joining pipe elements in end to end relation often use ring seals bridging the pipe elements, the ring seals being compressed between coupling segments and the pipe elements to ensure fluid tightness of the mechanical joint. It can be a challenge to position seals around pipe elements when the ring seals are made of non-elastomeric materials, such as thermoplastic or polymeric composites as well as metals, composites and combinations thereof suitable for extreme (high and low) temperature service where traditional elastomeric materials are inappropriate. The ring seals made from such compounds or metals tend to be relatively stiff, with low elasticity and low resilience, especially when compared with seals made from elastomeric materials such as artificial and natural rubber compounds.

The outer diameter of any commercial pipe of a particular schedule will vary about a nominal value, both greater and smaller, within an acceptable manufacturing tolerance range. Likewise, there are manufacturing tolerances that create variability in the diameter of the surfaces of the ring seal that interfaces with the pipe elements, as well as the inner surfaces of the coupling housings that engage with the seal and create the compressive force necessary to create a fluid-tight joint. In order to assure that such joints are fluid-tight, practical embodiments of mechanical couplings are often designed with significant radial compressive deformation of the seal so that there is sufficient sealing force over the entire combined range of manufacturing tolerances of the seal, coupling and pipe elements, especially in the condition where the outer diameter of the pipe element is at the lower limit of its tolerance range and the inner diameter of the seal and coupling are at the outer limits of their respective tolerance ranges. In order to accommodate that significant radial compressive deformation, a seal material is chosen that is able to tolerate that deformation without warping or buckling, while also remaining sufficiently resilient and elastic. Ideally, such materials will have a relatively low modulus of elasticity, which is the relationship between the deformation of the material and the force required to create that deformation, ensuring that the high radial compressive deformation that mechanical coupling seals require can be applied through common means, such as with bolts, and that the couplings do not need to be made of impractically heavy sections and strong materials in order to tolerate those forces. Such materials are often highly elastic, meaning that they can undergo significant total deformation before the material is itself damaged. Therefore, highly elastic materials with a relatively low modulus of elasticity, such as elastomers, are commonly used in such circumstances due to their ability to accommodate that high degree of radial compressive deformation with moderate applied forces, without damage to the material, and without the seal distorting or warping in a manner that would compromise its effectiveness. However, such seal materials have drawbacks, such as limited ability to resist high or low temperature environments or certain chemicals. Alternative seal materials, such as metals, thermoplastics, fluoropolymers, or composite materials, offer improved performance with a wider variety of fluids and in those high or low temperature environments, but such materials often have a significantly higher modulus of elasticity combined with lower elasticity, resilience, and ability to tolerate the deformation needed to ensure effective sealing over the combined tolerance ranges of the seal, coupling, and pipe elements without damage to the material. The high forces needed to exert the required radial compression on these alternative materials may not be readily achieved without, for instance, excessive bolt torque, due to the higher modulus of elasticity of those alternative materials. Even where such high forces can be applied, seals made from such alternative materials may not readily accommodate those forces, and may warp or buckle, compromising the effectiveness of the seal. Coupling housings may need to be made stiffer and heavier in order to both accommodate those high forces and attempt to prevent the seals from warping or buckling enough to compromise the effectiveness of the seal. Those alternative materials' relatively low elasticity may not allow them to tolerate the high deformation required of mechanical coupling seals without damage to the material itself. One way of attempting to overcome the challenges associated with such alternative materials in mechanical couplings that must remain fluid tight over a range of combined manufacturing tolerances is to attempt to reduce the effect of those combined tolerances by precisely machining the coupling, seal, and pipe elements. Another method is to design the seal to have a maximum inner diameter that is smaller than the smallest acceptable outer diameter of the pipe elements for which the seal is designed as this initial interference can reduce the amount of required radial compressive deformation. However, precision machining is costly, often impractical to perform in the field, and limits the types of pipe elements that can be used to those which are machined. Further, it is difficult for a technician to install a seal made of these alternative materials over a pipe element having a larger outer diameter than the seal inner diameter. Difficulties arise when significant force is necessary to position a seal around a pipe element due to the initial interference combined with these materials' relatively high modulus of elasticity. Such force may not be readily applied manually, and may result in damage to the sealing surfaces or require special equipment and techniques to effect installation, resulting in less practical and reliable jointing. There is clearly an opportunity to improve sealing of joints provided by mechanical couplings, especially for wider chemical compatibility and for high- or low-temperature applications that employ seals made of alternative materials that have a relatively high modulus of elasticity, lower elasticity, and lower resilience.

SUMMARY

The invention concerns a coupling for joining pipe elements in end to end relation. In one example embodiment the coupling comprises a plurality of segments attached to one another end to end and surrounding a central space. Each of the segments has a channel extending circumferentially around and facing the central space. Each of the channels is defined by first and second side surfaces located on opposite sides of the segments and a back surface extending between the side surfaces. A seal is positioned within the central space. The seal in this example comprises a ring having first and second lobes positioned on opposite sides thereof. The first lobe has a first lobe surface facing toward the first side surface and the second lobe has a second lobe surface facing toward the second side surface. When the seal is seated within the channel, at least a portion of the first and second lobe surfaces are in contact with the sidewalls such that the lobes deform toward a center of the channel. A connection member is positioned at one end of each of the segments in this example. The connection members on the segments are adjustably tightenable for drawing the segments toward one another and seating the ring within the channel, thereby deforming the seal.

In a specific example the first lobe surface is oriented angularly with respect to the first side surface and the second lobe surface is oriented angularly with respect to the second side surface when the seal is in the undeformed shape. By way of further example the first and second lobe surfaces comprise convexly curved surfaces when the seal is in the undeformed shape. In a further example the first and second side surfaces comprise convexly curved surfaces. In yet another example the first and second side surfaces comprise convexly curved surfaces.

In another example coupling for joining pipe elements in end to end relation, the coupling comprises a plurality of segments attached to one another end to end and surrounding a central space. Each of the segments has a channel extending circumferentially around and facing the central space. Each of the channels is defined by first and second side surfaces located on opposite sides of the segments and a back surface extending between the side surfaces. A seal is positioned within the central space. The seal comprises a ring having at least one lobe positioned on a side thereof, the at least one lobe having a lobe surface facing toward the first side surface. When the seal is seated within the channel, at least a portion of the lobe surface is in contact with the first sidewall such that the at least one lobe deforms toward a center of the channel. Connection members are positioned at opposite ends of each of the segments. The connection members are adjustably tightenable for drawing the segments toward one another and seating the ring within the channel, thereby deforming the lobes.

Another example coupling for joining pipe elements in end to end relation comprises a plurality of segments attached to one another end to end and surrounding a central space. Each of the segments has a channel extending circumferentially around and facing the central space. Each of the channels is defined by first and second side surfaces located on opposite sides of the segments and a back surface extending between the side surfaces. A seal is positioned within the central space. The seal comprises a ring having first and second lobes positioned on opposite sides thereof, the first lobe having a first lobe surface facing toward the first side surface and the second lobe having a second lobe surface facing toward the second side surface. When the seal is in an undeformed state, at least a portion of the first and second lobe surfaces is wider than the widest distance between the first and second side surfaces. Connection members are positioned at opposite ends of each of the segments. The connection members are adjustably tightenable for drawing the segments toward one another and seating the ring within the channel, thereby deforming the lobes.

In a particular example embodiment, the first lobe surface is oriented angularly with respect to the first side surface and the second lobe surface is oriented angularly with respect to the second side surface when the seal is in the undeformed shape. By way of further example, the first and second lobe surfaces comprise convexly curved surfaces when the seal is in the undeformed shape. In another example the first and second side surfaces comprise convexly curved surfaces. By way of example the first and second side surfaces comprise convexly curved surfaces.

In another example coupling for joining pipe elements in end to end relation, the coupling comprises a plurality of segments attached to one another end to end and surrounding a central space. Each of the segments has a channel extending circumferentially around and facing the central space. Each of the channels is defined by first and second side surfaces located on opposite sides of the segments and a back surface extending between the side surfaces. A seal is positioned within the central space. The seal comprises a ring having first and second lobes positioned on opposite sides thereof. The first lobe has a first lobe surface facing toward the first side surface and the second lobe has a second lobe surface facing toward the second side surface. When the seal is in an undeformed state, the first lobe surface is oriented angularly with respect to the first side surface and the second lobe surface is oriented angularly with respect to the second side surface. Connection members are positioned at opposite ends of each of the segments. The connection members are adjustably tightenable for drawing the segments toward one another and seating the ring within the channel, thereby deforming the lobes.

In a specific example, the connection members on each of the segments comprise a pair of projections, one the projection being positioned on each of the opposite ends of the segments, the projections having holes to receive a fastener, the fastener being adjustably tightenable. By way of example the coupling comprises two of the segments. In a particular example the first lobe surface has an orientation angle relative to the first side surface from 1° to 20°. In another example the orientation angle of the first lobe surface is 8°. Further by way of example the second lobe surface has an orientation angle relative to the second side surface from 1° to 20°. In yet another example, the orientation angle of the second lobe surface is 8°. In an example the second lobe surface has an orientation angle relative to the second side surface from 1° to 20°. In a specific example the orientation angle of the second lobe surface is 8°.

By way of example, the seal is formed of a rubber material. In another example embodiment the seal is formed of a material having low elasticity. By way of example, the seal is formed of a material having an elastic limit from 0.05% to 20%. In another example the seal is formed of a material having an elastic limit from 0.5% to 10%. In yet another example the seal is formed of a material having an elastic limit from 1% to 5%.

In an example embodiment the material having low elasticity is selected from the group consisting of thermoplastic resins, thermosets, epoxies and composites including polyethylene, polypropylene, polyamides, polyvinyl chloride, polycarbonate, polystyrene, acetals, acrylics, fluoropolymers and combinations thereof.

In an example embodiment each of the segments further comprises first and second keys positioned on opposite sides of the segments. Each of the keys extends circumferentially around and projects toward an axis extending through the central space. In an example, the first keys on each of the segments are positioned in spaced relation to the first side surfaces of the segments. In a further example the second keys on each of the segments are positioned in spaced relation to the second side surfaces of the segments. By way of example each of the keys comprises an arcuate surface facing the axis.

In a further example, a first gland is attached to the first lobe and a second gland attached to the second lobe. The first and second glands extend circumferentially about the ring. The first gland has a first sealing surface, the second gland has a second sealing surface, and the first and second sealing surfaces face the central space.

An example embodiment further comprises a first spring element positioned on the first gland opposite to the first sealing surface and a second spring element positioned on the second gland opposite to the second sealing surface. The spring elements extend circumferentially around the ring and bias the first and second sealing surfaces toward the central space.

The invention further encompasses, in combination, first and second pipe elements and a coupling for joining the pipe elements in end to end relation. In an example embodiment, the coupling comprises a plurality of segments attached to one another end to end and surrounding a central space. The pipe elements are received within the central space. Each of the segments has a channel extending circumferentially around and facing the central space. Each of the channels is defined by first and second side surfaces located on opposite sides of the segments and a back surface extending between the side surfaces. A seal is positioned within the central space. The seal comprises a ring surrounding the pipe elements. The ring has first and second lobes positioned on opposite sides thereof. The first lobe has a first lobe surface facing toward the first side surface and the second lobe has a second lobe surface facing toward the second side surface. When the seal is in an undeformed state, the first lobe surface is oriented angularly with respect to the first side surface and the second lobe surface is oriented angularly with respect to the second side surface. Connection members are positioned at opposite ends of each of the segments. The connection members are adjustably tightenable for drawing the segments toward one another and seating the ring within the channel, thereby deforming the lobes.

In an example combination, the connection members on each of the segments comprise a pair of projections, one the projection being positioned on each of the opposite ends of the segments, the projections having holes to receive a fastener, the fastener being adjustably tightenable. By way of example the coupling comprises two of the segments. In an example embodiment the first lobe surface has an orientation angle relative to the first side surface from 1° to 20°. In a specific example, the orientation angle of the first lobe surface is 8°. In another example the second lobe surface has an orientation angle relative to the second side surface from 1° to 20°. In a specific example, the orientation angle of the second lobe surface is 8°. By way of example, the second lobe surface has an orientation angle relative to the second side surface from 1° to 20°. In a specific example, the orientation angle of the second lobe surface is 8°.

In one example embodiment, the seal is formed of a rubber material. In another example, the seal is formed of a material having low elasticity. In a specific example, the seal is formed of a material having an elastic limit from 0.05% to 20%. By way of further example, the seal is formed of a material having an elastic limit from 0.5% to 10%. In a particular example embodiment, the seal is formed of a material having an elastic limit from 1% to 5%.

By way of example, the material having low elasticity is selected from the group consisting of thermoplastic resins, thermosets, epoxies and composites including but not limited to polyethylene, polypropylene, polyamides, polyvinyl chloride, polycarbonate, polystyrene, acetals, acrylics, fluoropolymers and combinations thereof.

In an example embodiment, each of the segments further comprises first and second keys positioned on opposite sides of the segments. Each of the keys extends circumferentially around and projects toward an axis extending through the central space. By way of example, the first keys on each of the segments are positioned in spaced relation to the first side surfaces of the segments. In a further example, the second keys on each of the segments are positioned in spaced relation to the second side surfaces of the segments. In another example, each of the keys comprises an arcuate surface facing the axis. In another example embodiment, each of the pipe elements comprises a respective circumferential groove positioned proximate to an end of each of the pipe elements, the keys engaging the grooves upon adjustable tightening of the connection members.

In an example combination a first gland is attached to the first lobe and a second gland attached to the second lobe. The first and second glands extend circumferentially about the ring. The first gland has a first sealing surface facing the central space. The second gland has a second sealing surface facing the central space. The sealing surfaces define an inner diameter substantially equal to an outer diameter of the pipe elements.

By way of example the combination further comprises a first spring element positioned on the first gland opposite to the first sealing surface. A second spring element is positioned on the second gland opposite to the second sealing surface. The spring elements extend circumferentially around the ring and bias the first and second sealing surfaces toward the pipe elements.

In another example embodiment, a first gland is attached to the first lobe and a second gland is attached to the second lobe. The first and second glands extend circumferentially about the ring. The first gland has a first sealing surface facing the central space, the second gland having a second sealing surface facing the central space, and the sealing surfaces defining an inner diameter greater than an outer diameter of the pipe elements when the seal is in the undeformed state.

In a specific example embodiment, the inner diameter defined by the sealing surfaces exceeds the outer diameter of the pipe elements from 0.001 inches to 0.3 inches when the seal is in the undeformed shape. In another example, the inner diameter defined by the sealing surfaces exceeds the outer diameter of the pipe elements by 0.05 inches when the seal is in the undeformed shape.

By way of example, the combination further comprises a first spring element positioned on the first gland opposite to the first sealing surface and
    a second spring element positioned on the second gland opposite to the second sealing surface. The spring elements extend circumferentially around the ring and bias the first and second sealing surfaces toward the pipe elements.

The invention further encompasses a method of joining first and second pipe elements together in end to end relation. In one example embodiment, the method comprises:
    supporting at least first and second segments in spaced apart relation to one another on a seal comprising a ring located in a central space surrounded by the segments, the at least first and second segments being attached to one another end to end, each of the at least first and second segments having a circumferential channel, the ring being received within the circumferential channels, the ring having first and second circumferential lobes on opposite sides thereof, the first and second circumferential lobes having respective first and second lobe surfaces respectively facing first and second side surfaces defining the circumferential channel, the first lobe surface being angularly oriented with respect to the first side surface, the second lobe surface being angularly oriented with respect to the second side surface;

inserting the first and second pipe elements axially into the central space and engaging the first and second pipe elements respectively with the first and second circumferential lobes on opposite sides of the ring;

drawing the at least first and second segments toward the central space, thereby deforming the ring so as to substantially align the first lobe surface with the first side surface and to substantially align the second lobe surface with the second side surface.

By way of further example, the at least first and second segments each comprises first and second keys positioned on opposite sides of the segments. Each of the keys extends circumferentially around and projects toward the pipe elements. In this example the method further comprises engaging the keys with the pipe elements upon the drawing the at least first and second segments toward one another.

An example method further comprises engaging the keys within circumferential grooves located in the first and second pipe elements.

Another example method of joining first and second pipe elements together in end to end relation comprises:

inserting the first and second pipe elements into a central space surrounded by a seal comprising a ring having first and second circumferential lobes on opposite sides thereof;

surrounding the ring by at least a first and a second segment of a coupling, each of the segments having a circumferential channel, the ring being received within the circumferential channels, the first and second lobes having respective first and second lobe surfaces respectively facing first and second side surfaces defining the circumferential channel, the first lobe surface being angularly oriented with respect to the first side surface, the second lobe surface being angularly oriented with respect to the second side surface;

drawing the at least first and second segments toward one another, thereby deforming the ring so as to substantially align the first lobe surface with the first side surface and to substantially align the second lobe surface with the second side surface.

Further by way of example the at least first and second segments each comprises first and second keys positioned on opposite sides of the segments. Each of the keys extend circumferentially around and project toward the pipe elements. The method in this example further comprises engaging the keys with the pipe elements upon the drawing the at least first and second segments toward one another. By way of further example, the method comprises engaging the keys within circumferential grooves located in the first and second pipe elements.

BRIEF DESCRIPTION OF THE DRAWINGS

FIGS. 3 and 4 are longitudinal sectional views taken at line 3-3 of FIG. 1; and

DETAILED DESCRIPTION

Figure 1:
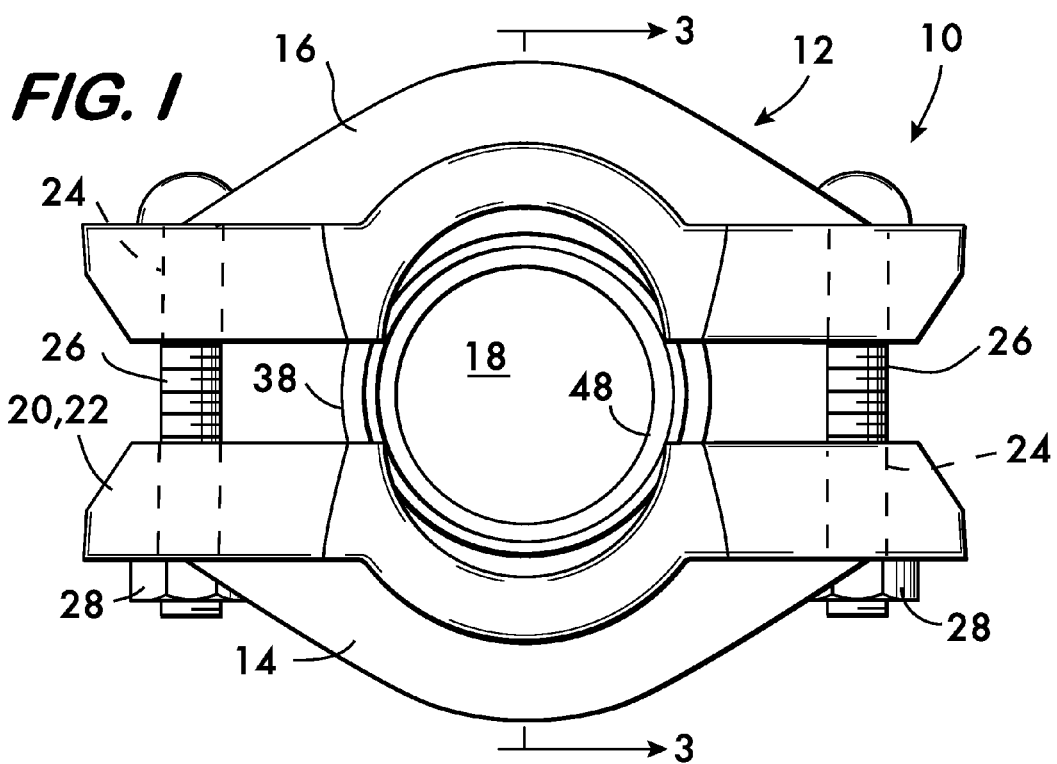
FIG. 1 is an axial end view of an example combination coupling and pipe elements according to the invention.
Figure 2:
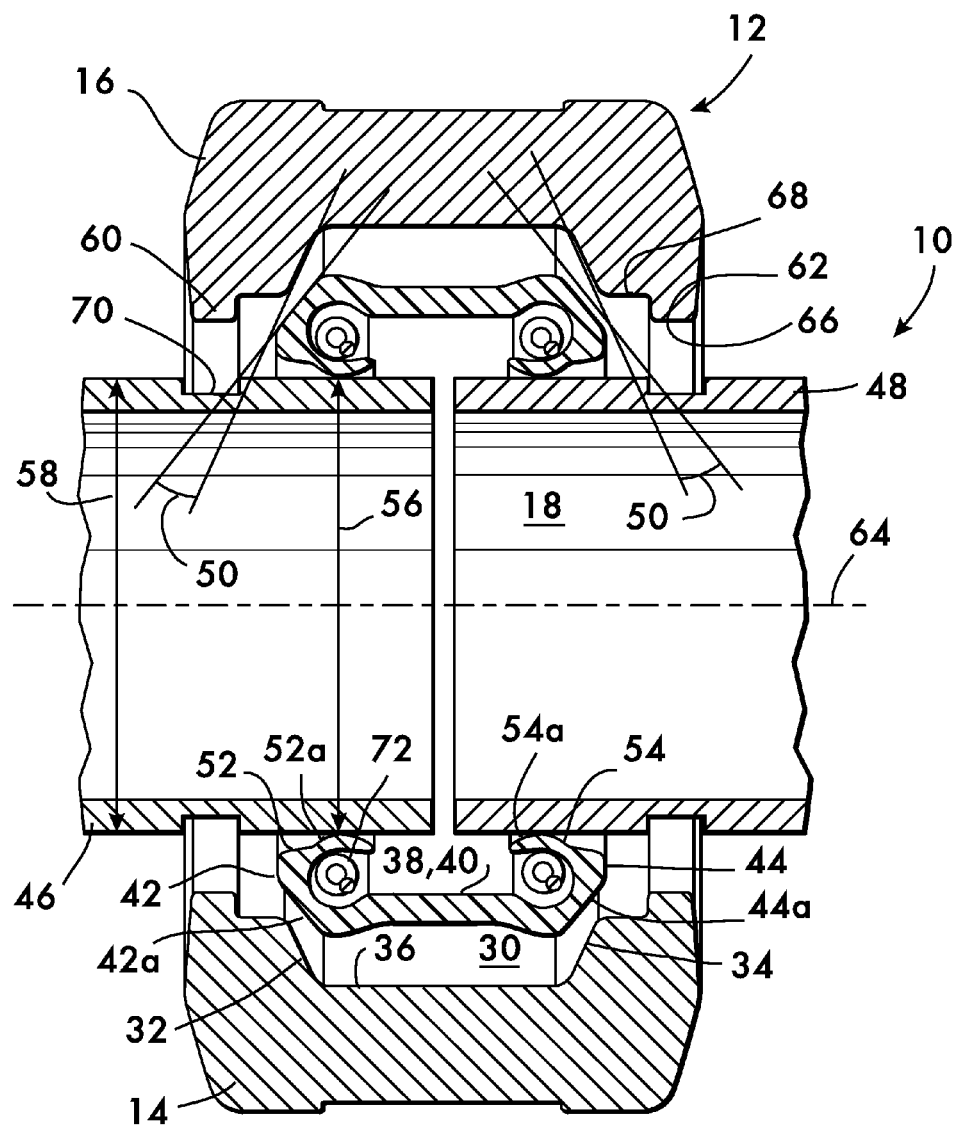
FIG. 2 is a longitudinal sectional view the example combination coupling and pipe elements shown in FIG. 1.

FIGS. 1 and 2 show an example combination coupling and pipe elements 10 according to the invention. Combination 10 comprises a coupling 12 having two segments 14 and 16 joined to one another end to end surrounding a central space 18. Although two segments 14 and 16 are illustrated in this example, the coupling 12 may comprise more than two segments. Each of the segments 14 and 16 has at least one connection member 20 positioned at an end. In this example embodiment, each segment 20 has two connection members 20 at opposite ends thereof. The connection members 20 connect the segments end to end and are adjustably tightenable to permit the segments 14 and 16 to be drawn toward one another and the central space 18. In this example the connection members 20 comprise projections 22 having holes 24 that accept fasteners, such as bolts 26 and nuts 28, the fasteners and the projections providing the adjustable tightenablity of the segments.

As shown in FIG. 2, each of the segments 14 and 16 comprises a circumferentially extending channel 30. Channel 30 faces the central space 18 and is defined by first and second side surfaces 32 and 34 located on opposite sides of each of the segments 14 and 16. The channel 30 is further defined by a back surface 36 extending between the side surfaces. A seal 38 is positioned within the central space 18. In this example the seal 38 comprises a ring 40 having first and second lobes 42 and 44 positioned on opposite sides of the ring. Each lobe 42 and 44 comprises a respective lobe surface 42a and 44a. First lobe surface 42a faces toward the first side surface 32 of the channel 30, and the second lobe surface 44a faces toward the second side surface 34. When the seal 38 is in an undeformed state (shown in FIGS. 1 and 2), for example, before the bolts 26 are tightened to draw the segments toward the central space 18 and compress the ring 40 against the pipe elements 46 and 48, the first lobe surface 42a is angularly oriented relatively to the first side surface 32 of channel 30, and the second lobe surface 44a is angularly oriented relatively to the second side surface 34. Orientation angles 50 between the lobe surfaces 42a and 44a and their respective side surfaces 32 and 34 may range from about 1° to about 20°, 5° to about 15° and 7° to about 10°. An orientation angle 50 of about 8° is expected to be advantageous.

As further shown in FIG. 2, a first gland 52 is attached to the first lobe 42 and a second gland 54 is attached to the second lobe 44 of the ring 40. First and second glands 52 and 54 extend circumferentially about the ring 40, and each gland 52 and 54 has a respective sealing surface 52a and 54a facing the central space 18. Gland sealing surfaces 52a and 54a engage the outer surfaces of pipe elements 46 and 48 and define an inner diameter 56 of the ring 40. When the ring 40 is in an undeformed state, the inner diameters 56 respectively defined between the sealing surfaces 52a and 54a of glands 52 and 54 is greater than or substantially equal to the outer diameter 58 of the pipe elements 46 and 48. This relationship between the inner diameters 56 and the outer diameters 58 of the pipe elements 46 and 48 permits the pipe elements to be inserted into ring 40 with little or no resistance, even when the ring 40 is formed of relatively stiff material having low elasticity and low resilience. It is expected that it will be favorable for the inner diameters 56 defined by gland sealing surfaces 52a and 54a to exceed the outer diameters 58 of pipe elements 46 and 48 over a range from about 0.001 inches to about 0.3 inches. An inner diameter 56 exceeding the outer diameter 58 by about 0.05 inches is expected to be advantageous.

In the example combination 10 shown in FIGS. 1 and 2, each of the segments 14 and 16 of coupling 12 comprises first and second keys 60 and 62. Keys 60 and 62 are positioned on opposite sides of the segments 14 and 16 and extend circumferentially there around. Each of the keys 60 and 62 project toward an axis 64 that extends through the central space 18, in this example the axis 64 being substantially coaxial with the pipe elements 46 and 48. In this example, each key 60, 62 has an arcuate surface 66 that faces the axis 64. As shown in FIG. 2, keys 60 and 62 are in spaced relation away from the side surfaces 32 and 34 defining the channel 30, there being a respective shoulder surface 68 positioned between each key 60 and 62, and a respective side surface 32, 34. Segments 14 and 16 having keys 60 and 62 are particularly advantageous for use with pipe elements having circumferential grooves 70. The keys engage the grooves when the segments are drawn toward one another by adjustable tightening of the connection members 20 and provide positive mechanical engagement to prevent the pipe elements 46 and 48 from separating from the coupling 12 due to axial forces and/or bending on the pipe elements during use. Other types of pipe elements, such as shouldered pipe elements, shoulder and bead pipe elements, as well as plain end pipe elements may also be used with couplings and seals according to the invention.

Seals 38 may be formed from rubber materials such as nitrile and EPDM. It is further expected that seals 38 as disclosed herein will be advantageously formed of relatively stiff material having low elasticity and low resilience suitable for extreme (high and low) temperature applications. In this specification the term "low elasticity" means materials having an elastic limit in the range of about 0.05% to about 20%, including about 0.5% to about 10% and about 1% to about 5%. Examples of such materials include thermoplastic resins, thermosets, epoxies and composites including but not limited to polyethylene, polypropylene, polyamides, polyvinyl chloride, polycarbonate, polystyrene, acetals, acrylics and fluoropolymers as well as combinations and composites thereof. Metals, such as stainless steel, spring steel, nitinol, copper and copper berylium are also candidate materials for such seals. Because the non-metal materials listed above and useful for seals tend to creep, it may be difficult for seals formed from them to maintain a fluid tight seal. Therefore, it is advantageous that such seals have pressure actuated glands 52 and 54 as disclosed herein. Further improvement in sealing performance may be obtained using spring elements 72 positioned behind the glands 52 and 54 opposite to said gland sealing surfaces 52a and 54a. The spring elements 72 extend circumferentially around the ring 40 and bias the gland sealing surfaces 52a and 54a toward the central space 18 and into engagement with the outer surfaces of pipe elements 46 and 48. The use of spring elements 72 compensates for the tendency of the materials having low elasticity and low resilience to creep and lose seal between the gland sealing surfaces 52a and 54a and the pipe elements 46 and 48. Various types of spring elements are feasible, including, for example, coil springs, leaf springs and elastomeric bands.

An example method of joining pipe elements in end to end relation is illustrated in FIGS. 1, 3 and 4. As shown in FIGS. 1 and 3, the segments 14 and 16 are attached to one another end to end via the connection members 20 and are supported in spaced apart relation on ring 40. This configuration allows pipe elements 46 and 48 to be inserted axially into the central space 18 from opposite sides of the coupling 12 without interference from the segment 14 and 16. Note that the first and second lobe surfaces 42a and 44a are angularly oriented with respect to the channel side surfaces 32 and 34 in this configuration. Because, when ring 40 is undeformed, the diameter 56, defined by the sealing surfaces 52a and 54a of glands 52 and 54, is substantially equal to or greater than the outer diameter 58 of the pipe elements 46 and 48, the pipe elements enter the central space 18 with little resistance and engage the lobes 42 and 44 by contacting their respective glands 52 and 54. Next, the segments 14 and 16 are drawn toward the central space 18 and the pipe elements 46 and 48 by tightening bolts 26 and nuts 28. As shown in FIG. 4, the ring 40 is compressed between the segments 14 and 16 and the pipe elements 46 and 48. The ring 40 is consequently deformed such that the first lobe surface 42a substantially aligns angularly with the first side surface 32 of channel 30, and the second lobe surface 44a substantially aligns angularly with the channel's second side surface 34. The angular deformation of lobes 42 and 44 also results in the gland surfaces 52a and 54a being compressed against the outer surfaces 46a and 48a of the pipe elements 46 and 48 to effect a fluid tight seal between the glands 52 and 54 and the pipe elements 46 and 48. The spring elements 72, when present, augment the sealing force between gland sealing surfaces 52a, 54a and the pipe elements 46 and 48 and help prevent creep of the material comprising the ring 40 from compromising the integrity of the seal. In the example shown, keys 60 and 62 on the segments 14 and 16 engage circumferential grooves 70 in the pipe elements 46 and 48.

In another example method for joining pipe elements in end to end relation, pipe elements 46 and 48 are first inserted axially into the central space 18 surrounded by ring 40. Due to the dimensional relationship between gland diameters 56 and pipe element diameters 58 (i.e., gland diameter 56 being as large as or larger than pipe element diameter 58 when ring 40 is undeformed), the pipes enter the central space 18 with little resistance. Next the segments 14 and 16 are assembled surrounding ring 40 and attached to one another end to end using bolts 26 and nuts 28 (see FIG. 1). Ring 40 is received within the channel 30, the first and second lobe surfaces 42a and 44a being angularly oriented with respect to the channel side surfaces 32 and 34. Next, the segments 14 and 16 are drawn toward the central space 18 and the pipe elements 46 and 48 by tightening bolts 26 and nuts 28. As shown in FIG. 4, the ring 40 is compressed between the segments 14 and 16 and the pipe elements 46 and 48. The ring 40 is consequently deformed such that the first lobe surface 42a substantially aligns angularly with the first side surface 32 of channel 30, and the second lobe surface 44a substantially aligns angularly with the channel's second side surface 34.

The angular deformation of lobes 42 and 44 also results in the gland surfaces 52a and 54a being compressed against the outer surfaces 46a and 48a of the pipe elements 46 and 48, reducing or eliminating the amount of radial compression applied by the back wall of the channel to the ring necessary to effect a fluid tight seal between the glands 52 and 54 and the pipe elements 46 and 48. The spring elements 72, when present, augment the sealing force between gland sealing surfaces 52a, 54a and the pipe elements 46 and 48 and help prevent creep of the material comprising the ring 40 from compromising the integrity of the seal. In the example shown, keys 60 and 62 on the segments 14 and 16 engage circumferential grooves 70 in the pipe elements 46 and 48.

Deformation of the ring 40 is ensured because the segments 14 and 16 are significantly stiffer than the ring, the segments typically being formed of ductile iron or steel.

FIGS. 5-8 show additional example embodiments of the coupling according to the invention. A general characteristic linking all of the embodiments disclosed herein concerns the width of the seal relative to the width of the channel. When the seal is in an undeformed state, at least a portion of the first and second lobe surfaces are in contact with the sidewalls such that the lobes deform toward a center of the channel when the seal is seated within the channel.

Figure 5:
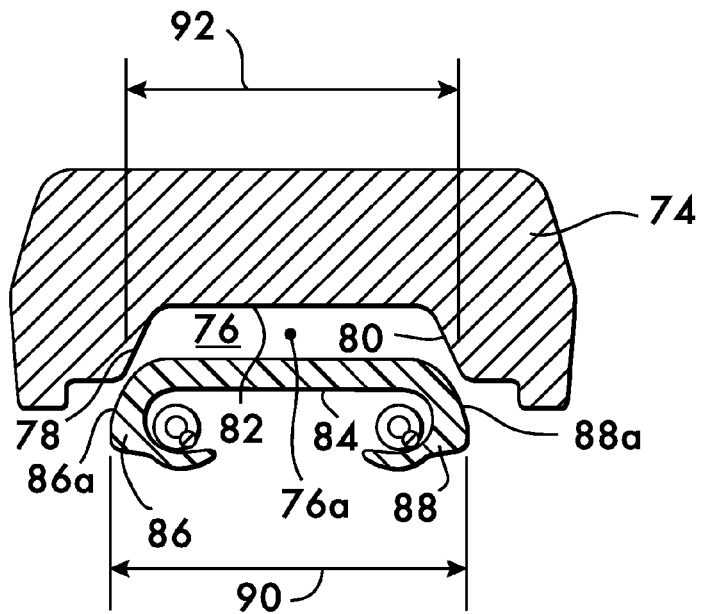
FIGS. 5-8 are partial sectional views of additional example embodiments of a coupling according to the invention.
Figure 6:
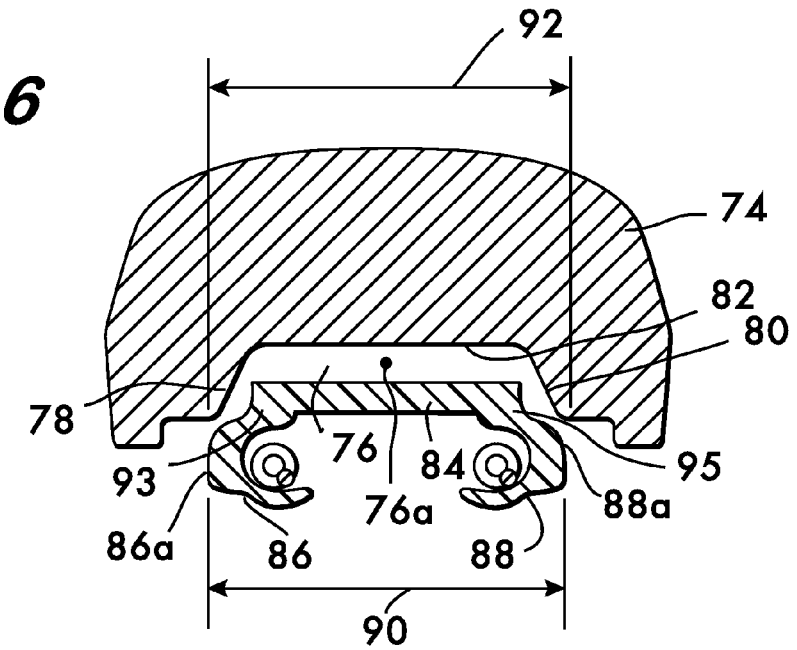

As shown in FIG. 5, segment 74 comprises channel 76 defined by oppositely disposed side surfaces 78 and 80 and a back surface 82. Seal 84 comprises lobes 86 and 88. Each lobe has a respective lobe surface 86a and 88a facing a respective side surface 78 and 80. In this example, lobe surfaces 86a and 88a are convexly curved and project outwardly away from one another so that at least a portion of the lobe surfaces 86a and 88a has a width 90 wider than a distance 92 (in this example the widest distance) between side surfaces 78 and 80. The difference in the widths 90 and 92 causes contact between lobe surfaces 86a and 88a and respective sidewalls 78 and 80 as the seal 84 is seated within the channel 76. This causes the lobes 86 and 88 to deform inwardly toward the center 76a of channel 76. FIG. 6 shows a design wherein the lobes 86 and 88 are displaced toward the central space 18 by respective extension portions 93 and 95.

Figure 7:
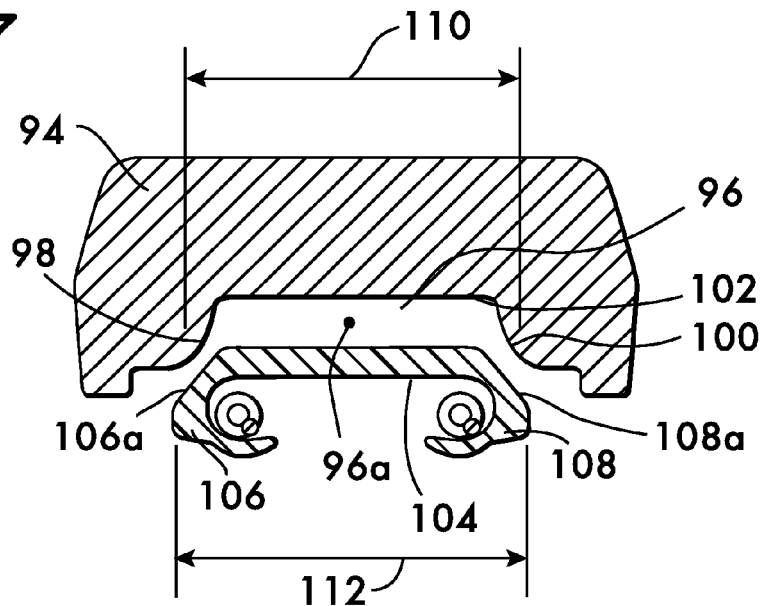

As shown in FIG. 7, segment 94 comprises channel 96 defined by oppositely disposed side surfaces 98 and 100 and a back surface 102. Seal 104 comprises lobes 106 and 108. Each lobe has a respective lobe surface 106a and 108a facing a respective side surface 98 and 100. In this example, side surfaces 98 and 100 are convexly curved and project inwardly toward one another so that at least a portion of the lobe surfaces 106a and 108a has a width 112 wider than a distance 110 between side surfaces 98 and 100. The difference in the widths 110 and 112 causes contact between lobe surfaces 106a and 108a and respective sidewalls 98 and 100 as the seal 104 is seated within the channel 96. This causes the lobes 106 and 108 to deform inwardly toward the center 96a of channel 96.

Figure 8:
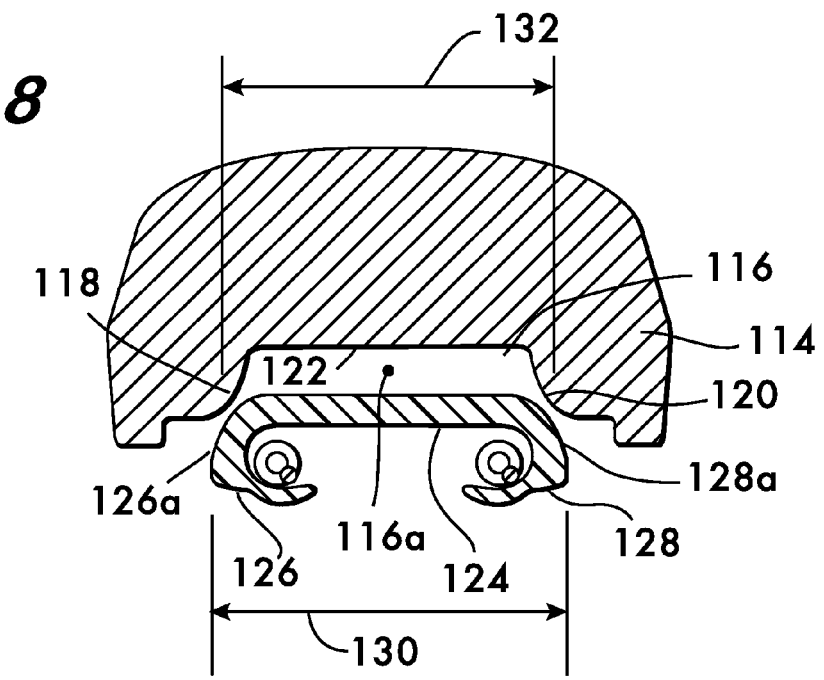

As shown in FIG. 8, segment 114 comprises channel 116 defined by oppositely disposed side surfaces 118 and 120 and a back surface 122. Seal 124 comprises lobes 126 and 128. Each lobe has a respective lobe surface 126a and 128a facing a respective side surface 118 and 120. In this example, side surfaces 118 and 120 are convexly curved and project inwardly toward one another and lobe surfaces 126a and 128a are convexly curved and face outwardly away from one another so that at least a portion of the lobe surfaces 126a and 128a has a width 130 wider than a distance 132 between side surfaces 118 and 120. The difference in the widths 130 and 132 causes contact between lobe surfaces 126a and 128a and respective sidewalls 118 and 120 as the seal 124 is seated within the channel 116. This causes the lobes 126 and 128 to deform inwardly toward the center 116a of channel 116.

Having the width of the lobe surfaces wider than the widest distance between the side surfaces defining the channel of the segment provides the camming action that deforms the lobes inwardly toward one another so as to effect a fluid tight seal when the segments are drawn toward one another and toward the pipe elements. This camming action is expected to be particularly effective when used in conjunction with seals formed of materials having low elasticity and low resilience.

What is claimed is:

1. A coupling for joining pipe elements in end to end relation, said coupling comprising:
   a plurality of segments attached to one another end to end and surrounding a central space, each of said segments having a channel extending circumferentially around and facing said central space, each of said channels being defined by first and second side surfaces located on opposite sides of said segments and a back surface extending between said side surfaces;
   a seal positioned within said central space, said seal comprising a ring having first and second lobes positioned on opposite sides thereof, said first lobe having a first lobe surface facing toward said first side surface and said second lobe having a second lobe surface facing toward said second side surface;
   a first gland attached to said first lobe and a second gland attached to said second lobe, said first and second glands extending circumferentially about said ring, said first gland having a first sealing surface, said second gland having a second sealing surface, said first and second sealing surfaces facing said central space;
   a first spring element positioned on said first gland opposite to said first sealing surface;
   a second spring element positioned on said second gland opposite to said second sealing surface, said spring elements extending circumferentially around said ring and biasing said first and second sealing surfaces toward said central space; wherein
   when said seal is in an undeformed state, said first lobe surface is oriented angularly with respect to said first side surface and said second lobe surface is oriented angularly with respect to said second side surface; and
   connection members being positioned at opposite ends of each of said segments, said connection members being adjustably tightenable for drawing said segments toward one another and seating said ring within said channel, thereby deforming said lobes.

2. The coupling according to claim 1, wherein said connection members on each of said segments comprise a pair of projections, one said projection being positioned on each of said opposite ends of said segments, said projections having holes to receive a fastener, said fastener being adjustably tightenable.

3. The coupling according to claim 1, wherein said coupling comprises two of said segments.

4. The coupling according to claim 1, wherein said first lobe surface has an orientation angle relative to said first side surface from 1° to 20°.

5. The coupling according to claim 4, wherein said orientation angle of said first lobe surface is 8°.

6. The coupling according to claim 4, wherein said second lobe surface has an orientation angle relative to said second side surface from 1° to 20°.

7. The coupling according to claim 6, wherein said orientation angle of said second lobe surface is 8°.

8. The coupling according to claim 1, wherein said second lobe surface has an orientation angle relative to said second side surface from 1° to 20°.

9. The coupling according to claim 8, wherein said orientation angle of said second lobe surface is 8°.

10. The coupling according to claim 1, wherein said seal is formed of a rubber material.

11. The coupling according to claim 1, wherein said seal is formed of a material having low elasticity.

12. The coupling according to claim 11, wherein said seal is formed of a material having an elastic limit from 0.05% to 20%.

13. The coupling according to claim 11, wherein said seal is formed of a material having an elastic limit from 0.5% to 10%.

14. The coupling according to claim 11, wherein said seal is formed of a material having an elastic limit from 1% to 5%.

15. The coupling according to claim 11, wherein said material having low elasticity is selected from the group consisting of thermoplastic resins, thermosets, epoxies and composites including polyethylene, polypropylene, polyamides, polyvinyl chloride, polycarbonate, polystyrene, acetals, acrylics, fluoropolymers and combinations thereof.

16. The coupling according to claim 1, wherein each of said segments further comprises first and second keys positioned on opposite sides of said segments, each of said keys extending circumferentially around and projecting toward an axis extending through said central space.

17. The coupling according to claim 16, wherein said first keys on each of said segments are positioned in spaced relation to said first side surfaces of said segments.

18. The coupling according to claim 17, wherein said second keys on each of said segments are positioned in spaced relation to said second side surfaces of said segments.

19. The coupling according to claim 16, wherein each of said keys comprises an arcuate surface facing said axis.

20. In combination, first and second pipe elements and a coupling for joining said pipe elements in end to end relation, said coupling comprising:
a plurality of segments attached to one another end to end and surrounding a central space, said pipe elements being received within said central space, each of said segments having a channel extending circumferentially around and facing said central space, each of said channels being defined by first and second side surfaces located on opposite sides of said segments and a back surface extending between said side surfaces;
a seal positioned within said central space, said seal comprising a ring surrounding said pipe elements, said ring having first and second lobes positioned on opposite sides thereof, said first lobe having a first lobe surface facing toward said first side surface and said second lobe having a second lobe surface facing toward said second side surface;
a first gland attached to said first lobe and a second gland attached to said second lobe, said first and second glands extending circumferentially about said ring, said first gland having a first sealing surface facing said central space, said second gland having a second sealing surface facing said central space, said sealing surfaces defining an inner diameter substantially equal to an outer diameter of said pipe elements;
a first spring element positioned on said first gland opposite to said first sealing surface;
a second spring element positioned on said second gland opposite to said second sealing surface, said spring elements extending circumferentially around said ring and biasing said first and second sealing surfaces toward said pipe elements; wherein
when said seal is in an undeformed state, said first lobe surface is oriented angularly with respect to said first side surface and said second lobe surface is oriented angularly with respect to said second side surface; and
connection members being positioned at opposite ends of each of said segments, said connection members being adjustably tightenable for drawing said segments toward one another and seating said ring within said channel, thereby deforming said lobes.

21. The combination according to claim 20, wherein said connection members on each of said segments comprise a pair of projections, one said projection being positioned on each of said opposite ends of said segments, said projections having holes to receive a fastener, said fastener being adjustably tightenable.

22. The combination according to claim 20, wherein said coupling comprises two of said segments.

23. The combination according to claim 20, wherein said first lobe surface has an orientation angle relative to said first side surface from 1° to 20°.

24. The combination according to claim 23, wherein said orientation angle of said first lobe surface is 8°.

25. The combination according to claim 23, wherein said second lobe surface has an orientation angle relative to said second side surface from 1° to 20°.

26. The combination according to claim 25, wherein said orientation angle of said second lobe surface is 8°.

27. The combination according to claim 20, wherein said second lobe surface has an orientation angle relative to said second side surface from 1° to 20°.

28. The combination according to claim 27, wherein said orientation angle of said second lobe surface is 8°.

29. The coupling according to claim 20, wherein said seal is formed of a rubber material.

30. The combination according to claim 20, wherein said seal is formed of a material having low elasticity.

31. The coupling according to claim 30, wherein said seal is formed of a material having an elastic limit from 0.05% to 20%.

32. The coupling according to claim 30, wherein said seal is formed of a material having an elastic limit from 0.5% to 10%.

33. The coupling according to claim 30, wherein said seal is formed of a material having an elastic limit from 1% to 5%.

34. The combination according to claim 30, wherein said material having low elasticity is selected from the group consisting of thermoplastic resins, thermosets, epoxies and composites including but not limited to polyethylene, polypropylene, polyamides, polyvinyl chloride, polycarbonate, polystyrene, acetals, acrylics, fluoropolymers and combinations thereof.

35. The combination according to claim 20, wherein each of said segments further comprises first and second keys positioned on opposite sides of said segments, each of said keys extending circumferentially around and projecting toward an axis extending through said central space.

36. The combination according to claim 35, wherein said first keys on each of said segments are positioned in spaced relation to said first side surfaces of said segments.

37. The combination according to claim 36, wherein said second keys on each of said segments are positioned in spaced relation to said second side surfaces of said segments.

38. The combination according to claim 35, wherein each of said keys comprises an arcuate surface facing said axis.

39. The combination according to claim 35, wherein each of said pipe elements comprises a respective circumferential groove positioned proximate to an end of each of said pipe elements, said keys engaging said grooves upon adjustable tightening of said connection members.

40. In combination, first and second pipe elements and a coupling for joining said pipe elements in end to end relation, said coupling comprising:
- a plurality of segments attached to one another end to end and surrounding a central space, said pipe elements being received within said central space, each of said segments having a channel extending circumferentially around and facing said central space, each of said channels being defined by first and second side surfaces located on opposite sides of said segments and a back surface extending between said side surfaces;
- a seal positioned within said central space, said seal comprising a ring surrounding said pipe elements, said ring having first and second lobes positioned on opposite sides thereof, said first lobe having a first lobe surface facing toward said first side surface and said second lobe having a second lobe surface facing toward said second side surface;
- a first gland attached to said first lobe and a second gland attached to said second lobe, said first and second glands extending circumferentially about said ring, said first gland having a first sealing surface facing said central space, said second gland having a second sealing surface facing said central space, said sealing surfaces defining an inner diameter greater than an outer diameter of said pipe elements when said seal is in said undeformed state;
- a first spring element positioned on said first gland opposite to said first sealing surface;
- a second spring element positioned on said second gland opposite to said second sealing surface, said spring elements extending circumferentially around said ring and biasing said first and second sealing surfaces toward said pipe elements; wherein
- when said seal is in an undeformed state, said first lobe surface is oriented angularly with respect to said first side surface and said second lobe surface is oriented angularly with respect to said second side surface; and
- connection members being positioned at opposite ends of each of said segments, said connection members being adjustably tightenable for drawing said segments toward one another and seating said ring within said channel, thereby deforming said lobes.

41. The combination according to claim 40, wherein said inner diameter defined by said sealing surfaces exceeds said outer diameter of said pipe elements from 0.001 inches to 0.3 inches when said seal is in said undeformed shape.

42. The combination according to claim 40, wherein said inner diameter defined by said sealing surfaces exceeds said outer diameter of said pipe elements by 0.05 inches when said seal is in said undeformed shape.

* * * * *